United States Patent [19]
Vedder

[11] Patent Number: 5,892,664
[45] Date of Patent: Apr. 6, 1999

[54] INVERTER FOR CONNECTING A VARIABLE VOLTAGE POWER SOURCE TO A UTILITY GRID

[76] Inventor: Dietrich Vedder, 844 Burning Trail, Carol Stream, Ill. 60188

[21] Appl. No.: 781,803

[22] Filed: Jan. 10, 1997

[51] Int. Cl.[6] .................................................. H02M 3/335
[52] U.S. Cl. ............................................. 363/17; 323/906
[58] Field of Search ........................ 363/17, 98; 323/906; 307/45, 46

[56] References Cited

U.S. PATENT DOCUMENTS

| | | | |
|---|---|---|---|
| 4,366,388 | 12/1982 | Wilkerson | 307/46 |
| 4,404,472 | 9/1983 | Steigerwald | 323/906 |
| 4,445,049 | 4/1984 | Steigerwald | 307/45 |
| 4,719,550 | 1/1988 | Powell et al. | 363/37 |
| 5,155,672 | 10/1992 | Brown | 363/43 |
| 5,268,832 | 12/1993 | Kandatsu | 323/906 |
| 5,625,539 | 4/1997 | Nakata et al. | 363/17 |

*Primary Examiner*—Stuart N. Hecker

[57] ABSTRACT

A medium frequency transformer and electronic switches operate together to transfer electric power with variable voltage characteristics to a utility for co-generation purposes. Electric power with variable voltage, such as produced by a wind generator, is converted to variable voltage dc electric power. An inverter converts the variable voltage dc power to ac electric power of medium frequency and then matches the voltage of a utility power grid by using a medium frequency power transformer before injecting the power into that utility power grid. The amount of electric power that is transferred may be controlled, such that an input power source is allowed to operate at its optimum power output.

16 Claims, 10 Drawing Sheets

INVERTER FOR CONNECTING A VARIABLE VOLTAGE POWER SOURCE TO A UTILITY GRID

BACKGROUND OF THE INVENTION

1. Field of the Invention

This invention relates to circuitry for obtaining electrical power of conventional voltages and frequencies from sources of energy with variable output power.

2. Description of the Prior Art

In the alternate energy field, such as the generation of power through the force of the wind, the force of waves, use of waste energy, use of brake energy regenerated by a moving mass, or light shining on photo cells, there exist solutions to convert the dc electric power generated by the alternate energy source into ac electric power. In particular, in U.S. Pat. No. 4,366,388 Wilkerson shows how to connect the dc power generated by a wind generator to the ac electric power grid via a connecting inverter. This has the advantage, as Wilkerson describes, of synchronizing the generated power to the frequency and voltage of the power supply. It enables the user of such an inverter to make use of all the energy that is being produced as a co-generator of electricity with the power company.

The present invention represents a marked improvement over the inverter circuit invented by Wilkerson, in that it adapts the dc power source in a much better way to the ac electric power grid. Rather than simply connecting the dc power source to the utility circuit once per half cycle of the ac sinusoidal utility voltage, this invention handles the power transfer by many short alternating current pulses that may be varied in duration as well as frequency of occurrence throughout each half cycle of the utility voltage. In addition the alternating current pulses may be transformed to higher voltages or lower voltages as necessary by the difference between the dc input voltage and the momentary output voltage of the ac utility voltage, where momentary should be thought of as a few microseconds in contrast to the ac utility voltage, which has a duration of 8.33 milliseconds for 60 cycle power and 10 milliseconds for 50 cycle power.

This invention also improves on the inductive characteristics of the Wilkerson inverter at low input voltages, when the Wilkerson inverter injects all the power at the leading edge of the ac half cycle, which is equivalent to the behavior of an inductive load connected to the power grid. The present invention injects the power into the power grid throughout the entire half wave in a balanced manner, even at low dc input voltage.

This invention is also related to U.S. Pat. No. 4,445,049 by Steigerwald, which has as its goal the injection of a sinusoidal current into the utility grid that is matched to the power frequency. The Steigerwald invention requires, however, a constant dc input voltage that is at least as high as the highest voltage within the sinusoidal half cycle, which is 155 volts (110 times square-root of 2), if the current is injected into a 110 volt utility circuit. The present invention injects sinusoidal current into the utility grid by choosing the frequency and magnitude of dc current pulses and then filtering those current pulses.

It is an object of the present invention to extract power from a variable voltage dc source and convert the power, such that the power is injected into a utility power source in such a way as to maximize the power output of the dc source.

It is a further object of the present invention to do the power conversion in an energy efficient manner.

SUMMARY OF THE INVENTION

The present invention is a dc to ac inverter that transfers electric energy from a variable voltage ac or dc power source to a provider of electric power of constant frequency and constant voltage for co-generation purposes. The provider of electric power may be an electric utility or a stand-alone provider of power that produces amounts of power substantially larger than the amounts of power that is co-generated. If the variable voltage power source is an ac source, then the ac power must first be converted to dc power using diode circuits.

The dc power is connected through controllable switching means and through an inductor to the primary of a medium frequency power transformer operating in the frequency range between 500 and 100,000 cycles per second. The secondary winding of the transformer may be center-tapped and features multiple output connections, such that one of multiple different turns ratios may be used to optimize voltage matching between primary input and secondary output. In synchronism with the ac utility power using controllable switching means the optimal secondary winding is connected through rectifying diodes to the utility power connection. The rectification of the ac current is done in synchronism with the ac utility voltage, such that a positive rectification is selected during positive cycles of the ac power cycle and negative rectification is selected during the negative cycles of the ac power cycles.

The switching means are controlled by a microprocessor through appropriate driving circuits, such that the power is transferred by many ac pulses that consist of exactly one positive and one negative cycle. The number and position in time of these ac pulses may be controlled by a microprocessor to effect a transfer of power that matches the sinusoidal characteristics of the utility power. For each cycle of the power utility voltage the microprocessor calculates the optimum amount of energy that should be transferred by monitoring the dc input voltage. If the input voltage stays approximately constant measured over several cycles, then the total amount of charge (measured in coulombs) transferred from the dc input in the next cycles is not altered except as noted below. If the dc input voltage decreases, then the total amount of charge transferred in the next cycles is decreased slightly. If the dc input voltage increases, then the total amount of charge transferred in the next cycles is increased slightly. In this way the slow variations in the amount of power generated relative to the duration of one cycle of the utility power frequency are followed by the inverter.

In addition, the microprocessor will calculate the amount of energy transferred during each cycle by computing from the measured current and duration of each current pulse the amount of charge transferred. Then it multiplies the charge by the measured input voltage to find the energy transferred per cycle. Then it attempts to maximize the energy transferred per cycle by slightly decreasing and later increasing the amount of charge transferred. If the voltage increases during a charge transfer decrease such that the product of charge and voltage, which is energy, increases, then a better energy transfer position has been found. Similarly, if the voltage decreases during a charge transfer increase such that the product of charge and voltage increases, then a better energy transfer position has been found. Using this algorithm of hunting for a maximum energy transfer position the microprocessor 'learns' what the maximum power transfer position is.

The microprocessor distinguishes between its own attempts to maximize power transfer and changes in the generated input power (due to a change in wind speed, for example) by alternating short periods of hunting for a maximum energy transfer with short periods of inactive time, during which it attempts to monitor for any external power changes. If during a hunting period the voltage changes in an unexpected way, it will immediately revert back to monitoring for external power changes, which means it will simply increase charge transfer if voltage increases and decrease charge transfer if voltage decreases.

The microprocessor controls the charge transfer by controlling the duration of current pulses as well as their number per half cycle. The microprocessor will approximate a sinusoidal current flow into the utility grid by distributing the current pulses within a half cycle to create an average sinusoidal current flow.

DESCRIPTION OF THE INVENTION

Description of the Preferred Embodiment

Figure 1:
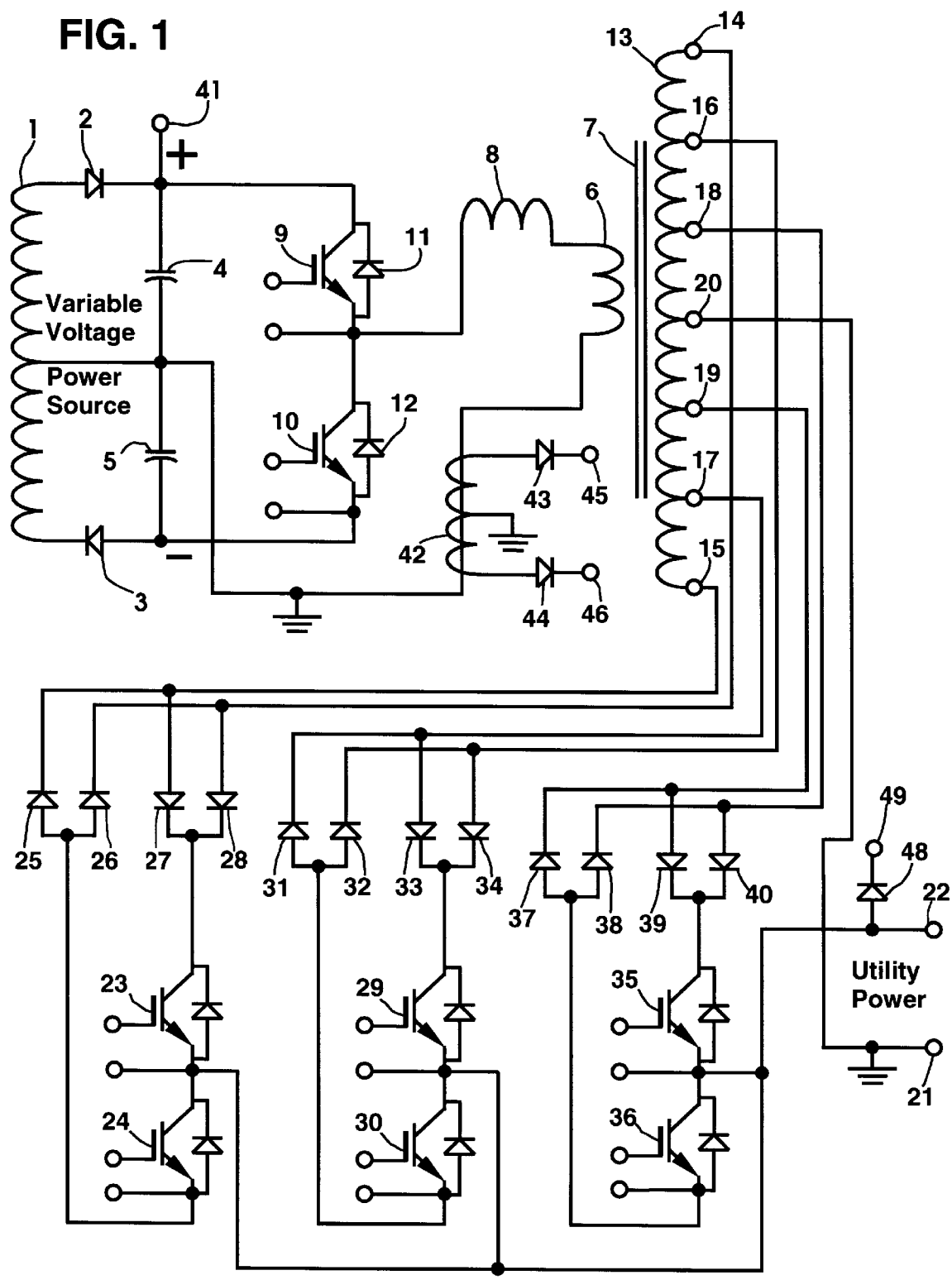
FIG. 1 is a schematic of one embodiment of the present invention with a center tapped input power source and no filtering at the output. The control circuitry is not shown in this schematic.

FIG. 1 shows one embodiment of an energy utilization circuit in accordance with the present invention. A variable voltage alternating power source 1 is driven by a prime mover (not shown), such as a windmill, ocean wave power generator, electric brakes, water wheels or turbines, or exercise equipment. Alternating power source 1 is center-tapped and connects through diodes 2 and 3 to capacitors 4 and 5 respectively, such that the ac input power is rectified to dc power using diodes 2 and 3. The center-tap of power source 1 is connected to the other sides of capacitors 4 and 5 creating a split dc power source. The center-tap of power source 1 and capacitors 4 and 5 are additionally connected to one side of the primary winding 6 of transformer 7, which may be a transformer with coaxial windings, such that the secondary windings are inside a tubular primary winding for the purpose of excellent performance at frequencies up to 100,000 cycles per second. The other side of primary winding 6 is connected to inductor 8. The circuit through the primary 6 and the inductor 8 is completed through electronic switch 9 to the positive terminal of capacitor 4, or through switch 10 to the negative terminal of capacitor 3. Diode 12 bypasses switch 10 in its opposite current direction and is used to carry the continuing current generated by inductor 8 when switch 9 is turned off. Similarly, diode 11 bypasses switch 9 in its opposite current direction to carry the continuing current generated by inductor 8 when switch 10 is turned off.

All electronic switches shown in FIG. 1 (and FIG. 7 and FIG. 8) are Insulated Gate Bipolar Transistors (IGBT). Other types of electronic switches, such as Silicon Controlled Rectifiers with gate turn-off capability can be used instead.

The secondary winding 13 of transformer 7 has multiple pairs of output terminals with respect to its center-tap connection 20, which is directly connected to the ground side 21 of the utility power connection. The pair of transformer output terminals 14 and 15 have a high turns ratio with respect to the input and generate the highest output voltage for a given primary input voltage. The pair 16 and 17 have a medium output voltage and the pair 18 and 19 have the lowest output voltage. Even though three pairs of output terminals are shown in FIG. 1, fewer or more pairs may be used in other embodiments of the invention.

Each secondary winding output pair is connected to a pair of switches and four rectifying diodes. This will now be explained for tranformer output terminals 14 and 15, which may alternately be connected to the positive half cycle of the utility power connection 22 through diodes 27 and 28 and switch 23. During the positive half cycle of the power utility connection, given that switch 23 is conducting, a positive voltage difference with respect to the utility voltage on terminal 14 will cause current to flow through diode 28 and switch 23 into the utility connection 22. Similarly, during that same positive half cycle, given that switch 23 is conducting, a positive voltage difference with respect to the utility voltage on terminal 15 will cause current to flow through diode 27 and switch 23 into the utility connection 22. In an analogous manner, during the negative half cycle of the utility power connection, terminal 14 may be connected through diode 26 and switch 24 to utility connection 22, causing current to flow from that utility connection into terminal 14, if terminal 14 is more negative then the utility power connection and switch 24 is conducting. Terminal 15 is connected through diode 25 and switch 24, when terminal 15 is more negative and switch 24 is conducting.

Terminals 16 and 17 work with the set of diodes 31, 32, 33, and 34 and switch set 29 and 30 in an identical manner as just described for terminals 14 and 15. Similarly, terminals 18 and 19 work with set of diodes 37, 38, 39, and 40 and switch set 35 and 36.

Given that there are multiple possible connections between output terminal pairs of the transformer and the utility power connection it should be explained that only one of the possible six switches 23, 24, 29, 30, 35, or 36 may conduct at any moment in time. Additionally, switches 23, 29, and 35 may only be switched on during a positive half cycle of the utility voltage, while switches 24, 30, and 36 may only be switched on during a negative half cycle of the utility voltage.

Description of the Control Circuit

Figure 2:
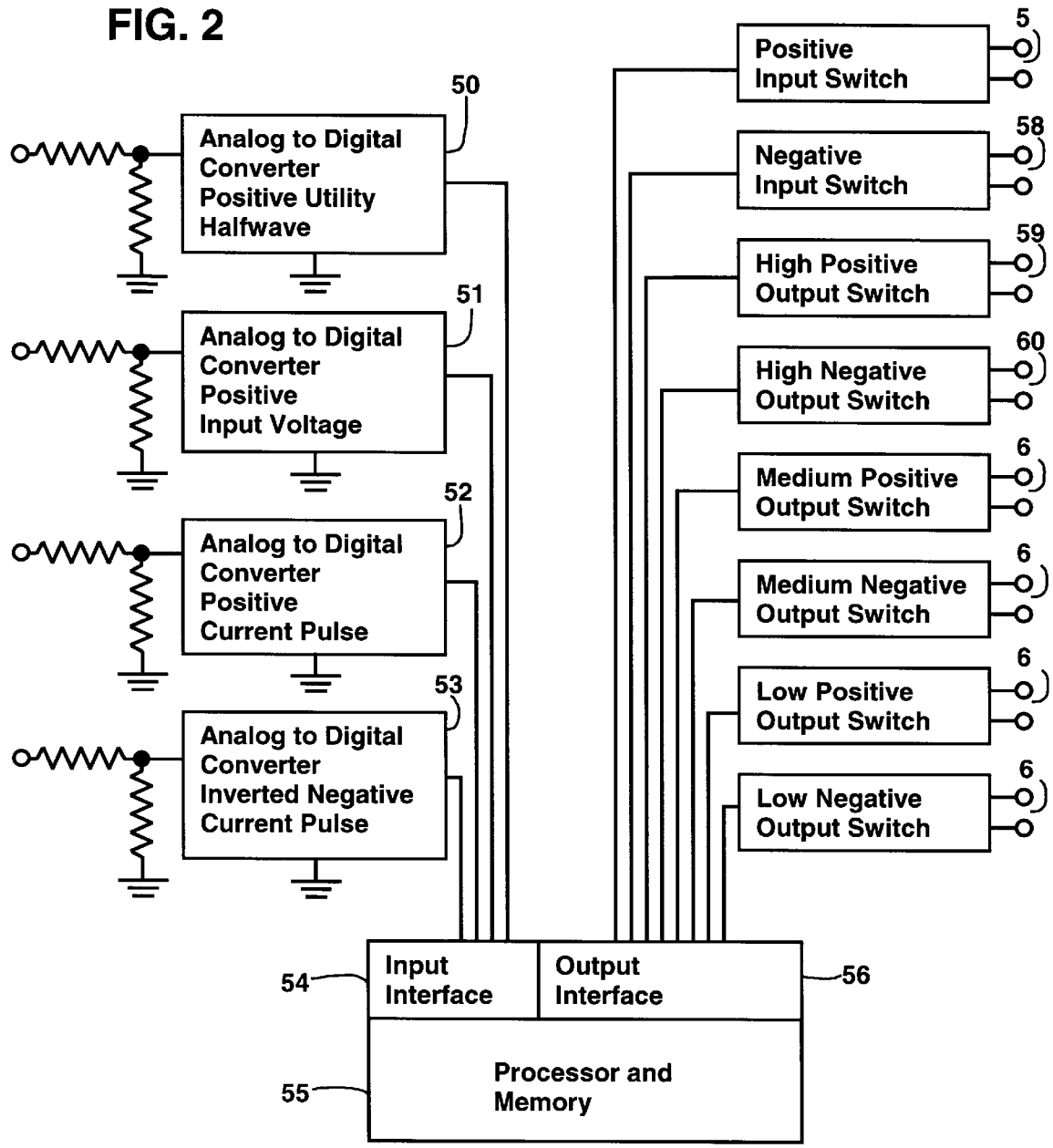
FIG. 2 is a part block diagram, part schematic showing the control circuits for the embodiment in FIG. 1.

The control circuit shown in FIG. 2 needs to measure four separate circuit parameters. The first one is the value of the dc input voltage, which is measured at point 41 shown in FIG. 1. The second parameter is the value and timing of the positive half cycle of the utility power, which is measured at point 49, which in turn connects to the utility power connection 22 through diode 48. The third parameter is the value of the positive current through the primary winding 6, which is measured at point 45 through current transformer 42 and diode 43; the fourth parameter is the value of the negative current through the primary winding 6, which is measured at point 46 through current transformer 42 and diode 44.

The values of the four parameters are converted by analog to digital (AD) converters into digital form. The value of the input dc voltage measured at point 41 is digitized by AD converter 50 after going through two voltage dividing resistors for voltage adjustment purposes. In an identical manner, the value of the positive half cycle utility voltage, measured at point 49, is digitized by AD converter 51. The value of the positive current, measured at point 45, is digitized by AD converter 52, and the value of the inverted negative current, measured at point 46, is digitized by AD converter 53. All four AD converter outputs are connected as inputs to the microprocessor input interface 54. The microprocessor 55 is programmed to generate appropriately timed output pulses through its output interface 56 that are connected to eight IGBT activation circuits. Each of these activation circuits turns on the IGBT switch it is connected to when its own microprocessor output in the output interface 56 is grounded. A The connectivity between activation circuits and IGBT switches is as follows (please note that the activation circuits are shown in FIG. 2 and the IGBT switches are shown in FIG. 1): Activation circuit 57 connects to the positive side input switch 9, activation circuit 58 connects to the negative side input switch 10, activation circuit 59 connects to the high positive-half-cycle output switch 23, activation circuit 60 connects to the high negative-half-cycle output switch 24, activation circuit 61 connects to the medium positive-half-cycle output switch 29, activation circuit 62 connects to the medium negative-half-cycle output switch 30, activation circuit 63 connects to the low positive-half-cycle output switch 35, and activation circuit 64 connects to the low negative-half-cycle output switch 36.

Description of Switch Activation Circuit

Figure 3:
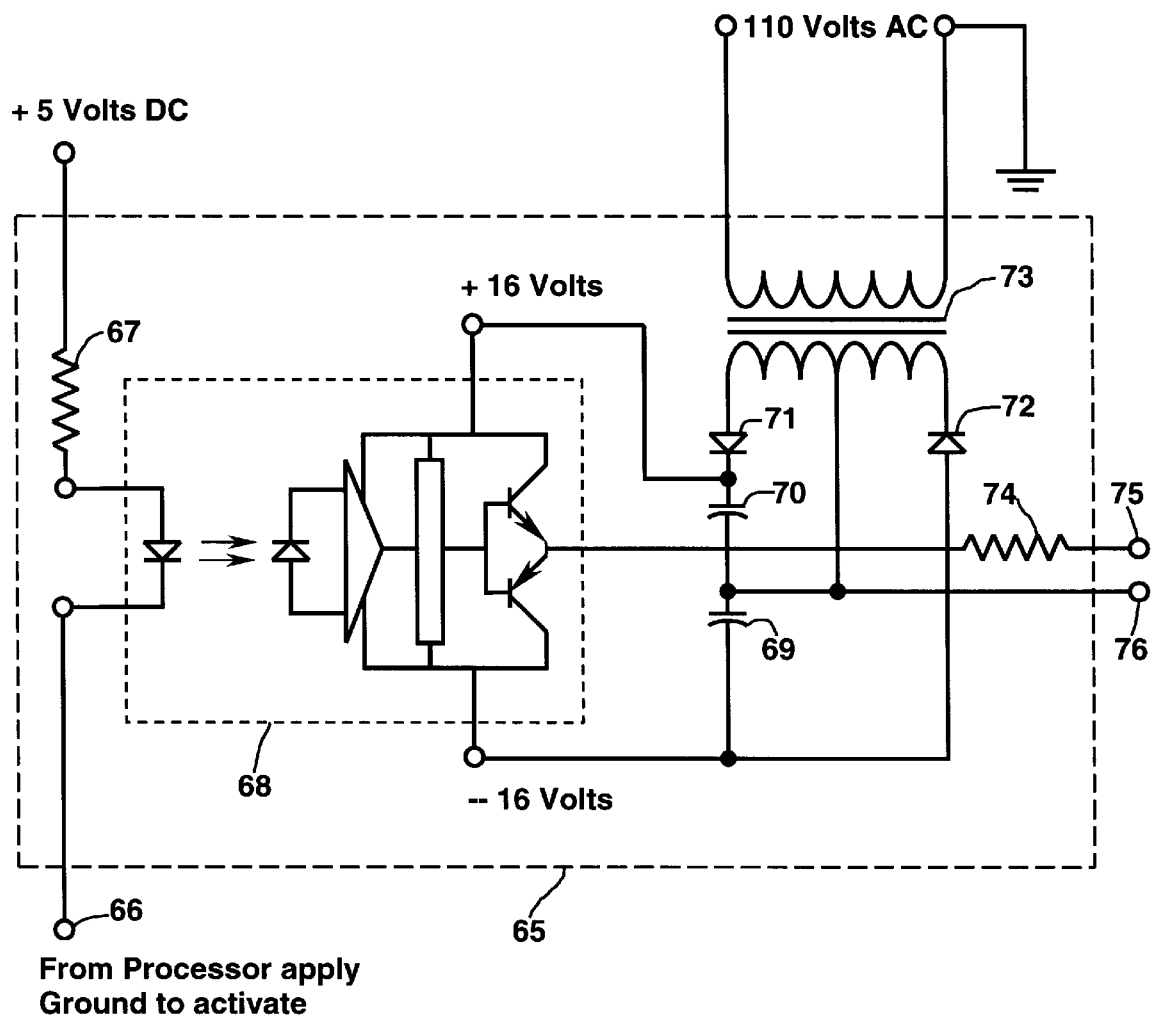
FIG. 3 is a schematic of the details of the driving circuits for an embodiment using Insulated Gate Bipolar Transistors (IGBT) as switching elements.

FIG. 3 shows the details for an individual IGBT activation circuit for completeness. An activation circuit 65 consists of an optical coupler 68, which is activated by grounding input lead 66. The input is powered through resistor 67. A divided +16/-16 volt power supply provides power to the output side of the optical coupler. The power supply itself consists of isolation transformer 73, diodes 71 and 72 and capacitors 69 and 70. The output voltage of the optical coupler 68 appears on output lead 75 connected through resistor 74. The output voltage on output lead 75 exists with respect to the other output lead 76, which is not grounded for isolation reasons.

If input lead 66 is grounded, then output lead 75 is at +16 volts with respect to output lead 76. If the input is not grounded, then output lead 75 is at -16 volts with respect to output lead 76. Output lead 75 is always connected to the gate of its associated IGBT switch. Output lead 76 is always connected to the emitter of its associated IGBT switch.

Other Embodiments

Figure 7:
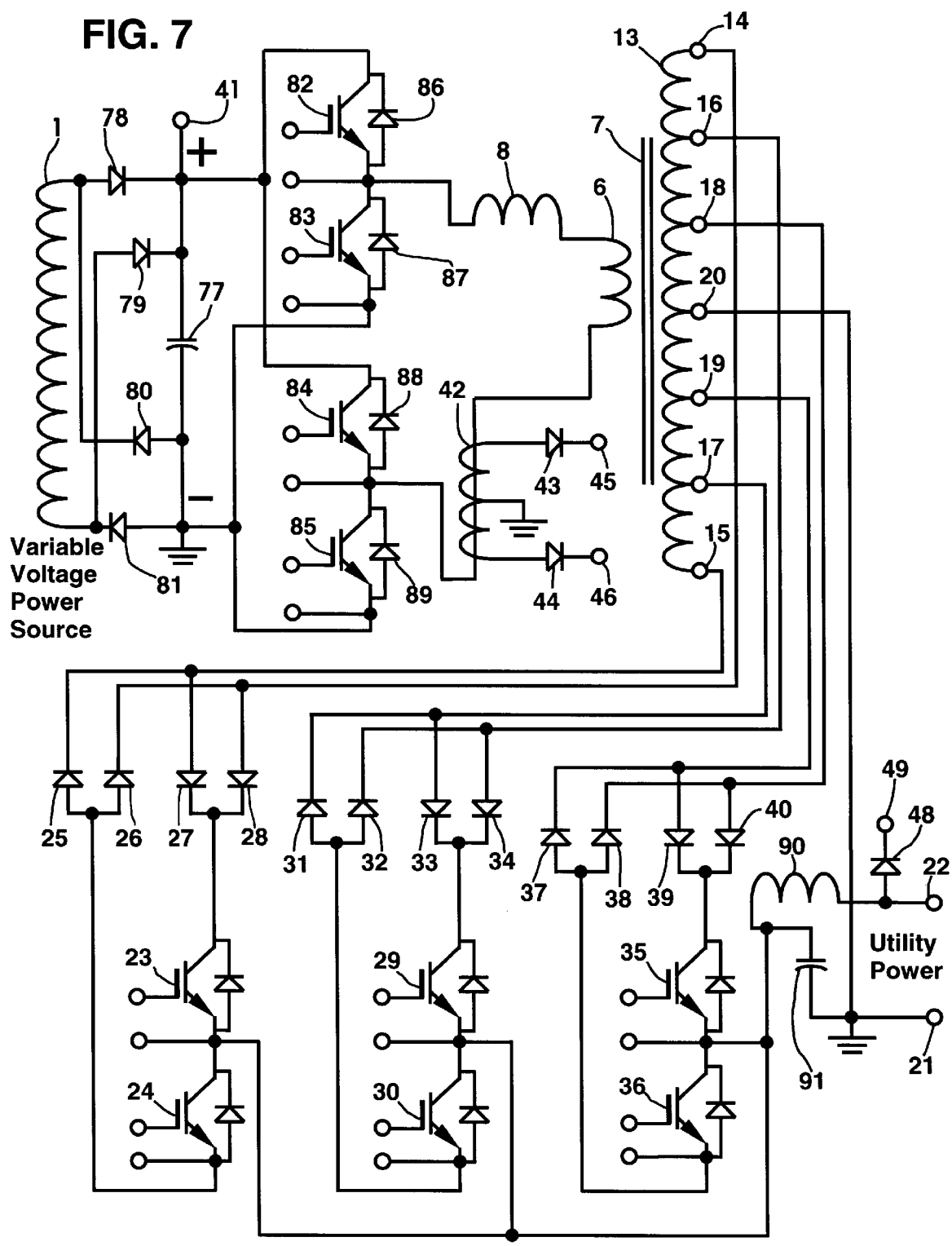
FIG. 7 is a schematic of another embodiment of the present invention with no center tap on the input power source and filtering at the output.

Another embodiment of the invention as well as an additional feature is represented in FIG. 7. In this embodiment the center-tapped input variable voltage power source shown in FIG. 1 has been replaced by a non-center-tapped variable voltage power source. The ac power generated by power source 1 is rectified by a full wave rectifier represented by diodes 78, 79, 80, and 81 and connected to capacitor 77. Capacitor 77 is then connected to the primary winding 6 of transformer 7 through inductor 8 in one of two ways depending on whether a positive or negative current is to be sent through winding 6. The positive current producing circuit consists of capacitor 77, IGBT switch 82, inductor 8, primary winding 6, and IGBT switch 85. Once both IGBTs 82 and 85 are turned off, the continuing current generated by inductor 8 flows through diodes 87 and 88 to recharge the capacitor partially. Similarly the negative current producing circuit consists of capacitor 77, IGBT switch 83, inductor 8, winding 6, and IGBT switch 84. Once both IGBTs 83 and 84 are turned off, the continuing current generated by inductor 8 flows through diodes 86 and 89 to recharge the capacitor partially.

The additional feature, also represented in FIG. 7 is a filter circuit, consisting of capacitor 91 and inductor 90, that filters the high frequency content due to the short current pulses used for energy transmittal through the medium frequency transformer 7. This additional feature may also be used together with the embodiment in FIG. 1 and the embodiment shown in FIG. 8.

An additional embodiment of this invention, not shown in any figure, is able to connect a variable voltage power source to a three phase utility connection by simply triplicating the circuit that connects to the center-tapped capacitors 4 and 5 in FIG. 1 or triplicating the circuits that connect to capacitor 77 in FIG. 7. Other multi-phase configurations, such as two-phase, or six phase may be handled by having the appropriate number of circuits matching the phase of the utility power supply connected to that power supply.

Figure 8:
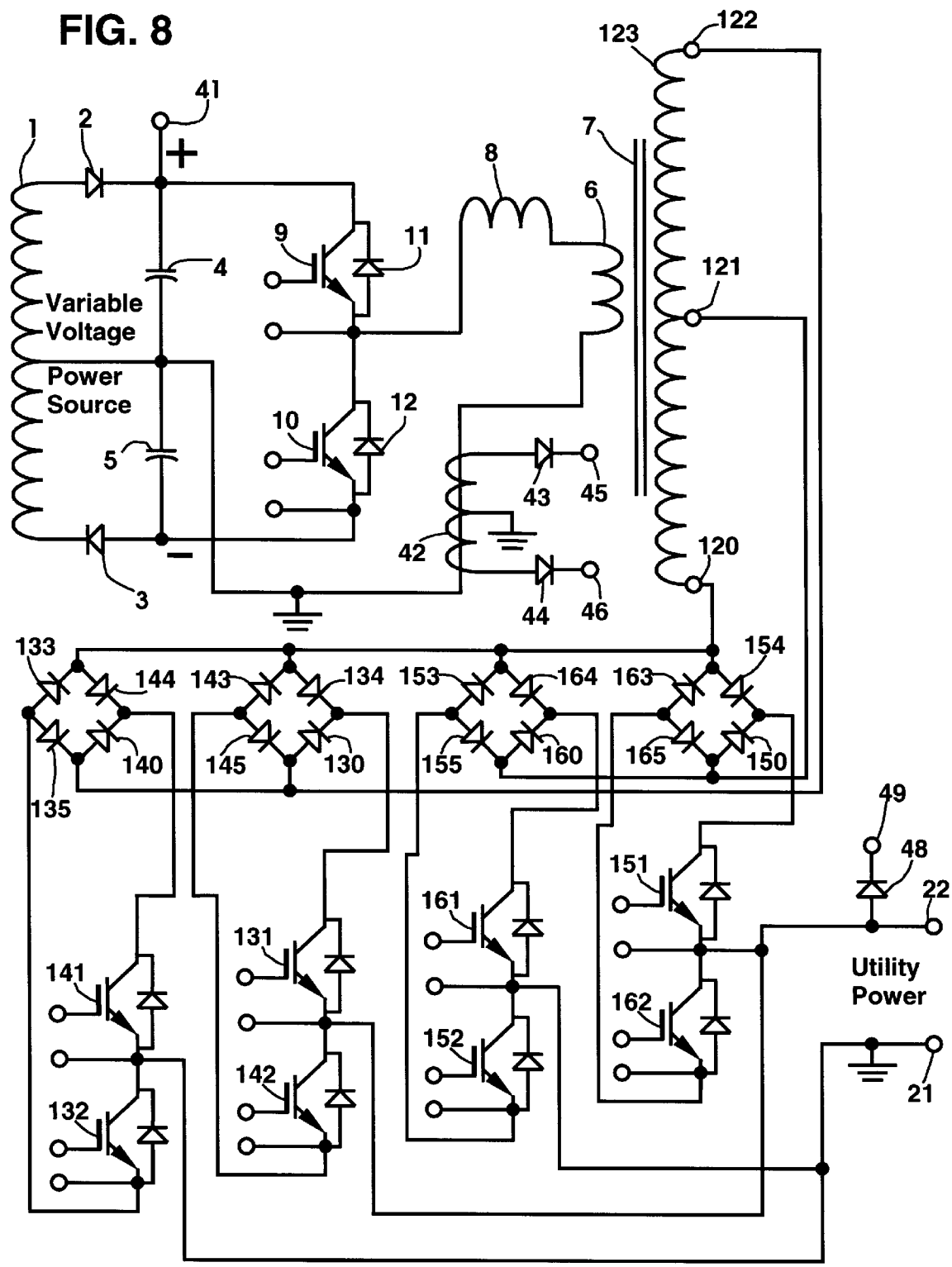
FIG. 8 is a schematic of another embodiment of the present invention with full wave rectification in the output circuit.

Another embodiment of the current invention is shown in FIG. 8. Input circuits up to the primary winding 6 of transformer 7 are identical to the embodiment in FIG. 1. But rectifying and switching arrangements connecting secondary winding 123 to the utility power terminations 22 and 21 are different from those shown in FIG. 1, they use full-wave rectification as compared to a rectification scheme based on center-tapped secondary winding 13 in FIG. 1.

FIG. 8 shows a secondary winding 123 that can produce a voltage on terminals 120 and 122, and it can produce a voltage on terminals 120 and 121. The voltage produced on terminals 120 and 122 is higher than the voltage produced on terminals 120 and 121. Only two sets of terminations are shown for reasons of keeping the drawing clear. Three or more sets of terminations may be constructed for secondary winding 123, in order to improve the voltage adaptation to the utility power terminations 22 and 21.

The current flow can be explained by using several scenarios. Assume that terminations 120 and 122 are used while the utility power termination 22 is positive with respect to termination 21. In that case the current flows from terminal 122, assuming it is positive, through diode 130 and switch 131, which must be turned on, to terminal 22. Then the current flows through the utility load to terminal 21, from there through switch 132, which must be turned on, and diode 133 to terminal 120. If terminal 120 is positive and not terminal 122, the current flows from terminal 120 through diode 134 and switch 131 to utility termination 22. The current flows through the utility load through termination 21, switch 132 and diode 135 back to terminal 122 on secondary winding 123.

In the case where utility power termination 22 is negative with respect to termination 21, the current flows from terminal 122, assuming it is positive, through diode 140 and switch 141, which must be turned on, to terminal 21. Then the current flows through the utility load to terminal 22, from there through switch 142, which must be turned on, and diode 143 to terminal 120. If terminal 120 is positive and not terminal 122, the current flows from terminal 120 through diode 144 and switch 141 to utility termination 21. The current flows through the utility load through termination 22, switch 142 and diode 145 back to terminal 122 on secondary winding 123.

If the terminals 121 and 120 are used, then analogous current paths exist as shown in FIG. 8.

For the full wave rectification scheme shown in FIG. 8, two switches are turned on to enable current flow between the secondary winding 123 and the utility terminations 22 and 21. There are four cases as follows:

1. Terminals 122 and 120 shall be connected while utility termination 22 is positive with respect to 21. Switches 131 and 132 must be turned on.
2. Terminals 122 and 120 shall be connected while utility termination 22 is negative with respect to 21. Switches 141 and 142 must be turned on.
3. Terminals 121 and 120 shall be connected while utility termination 22 is positive with respect to 21. Switches 151 and 152 must be turned on.
4. Terminals 121 and 120 shall be connected while utility termination 22 is negative with respect to 21. Switches 161 and 162 must be turned on.

Another embodiment of the current invention consists of all the circuitry in FIG. 7 from variable voltage power source 1 to primary winding 6 combined with all the circuitry in FIG. 8 from secondary winding 123 to the utility power terminations 22 and 21.

The embodiment shown in FIG. 8 may be connected to multi-phase providers of utility power, particularly three phase utility power, by providing multiple sets of diodes and switches between the terminals of secondary winding 123 and each phase of the utility power connection.

Figure 9:
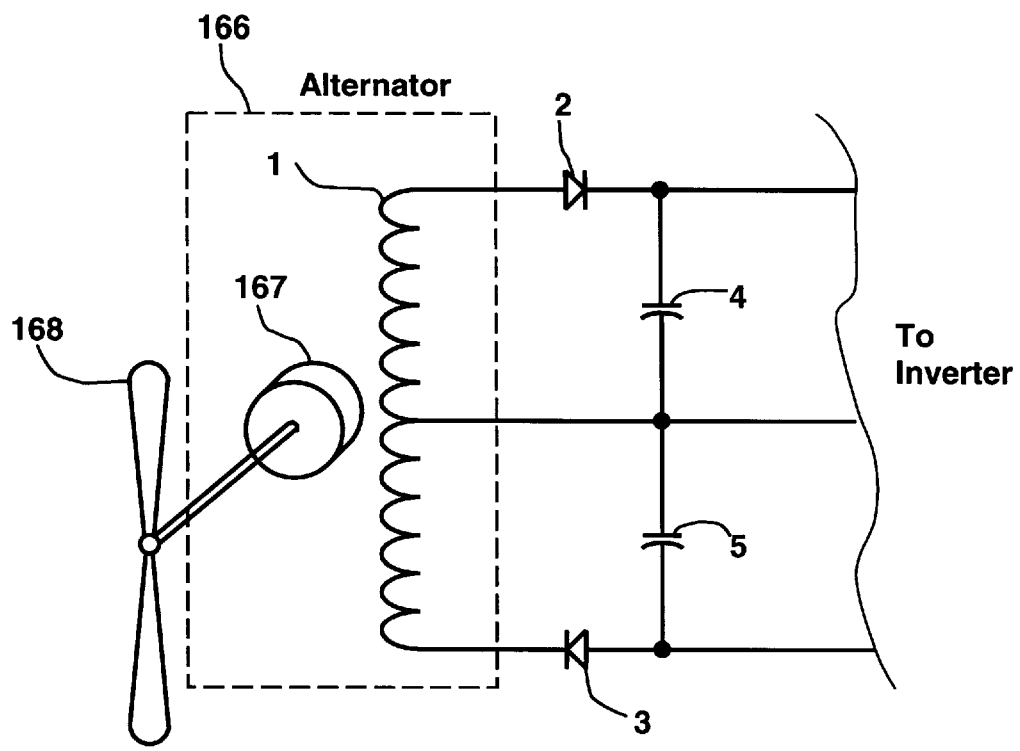
FIG. 9 is part block diagram part circuit schematic that shows a windmill providing mechanical power to an alternating current center tapped power source 1.

FIG. 9 shows the variable voltage alternating power source 1 to be the output winding of alternator 166, which has a rotor 167 driven by a windmill 168.

Figure 10:
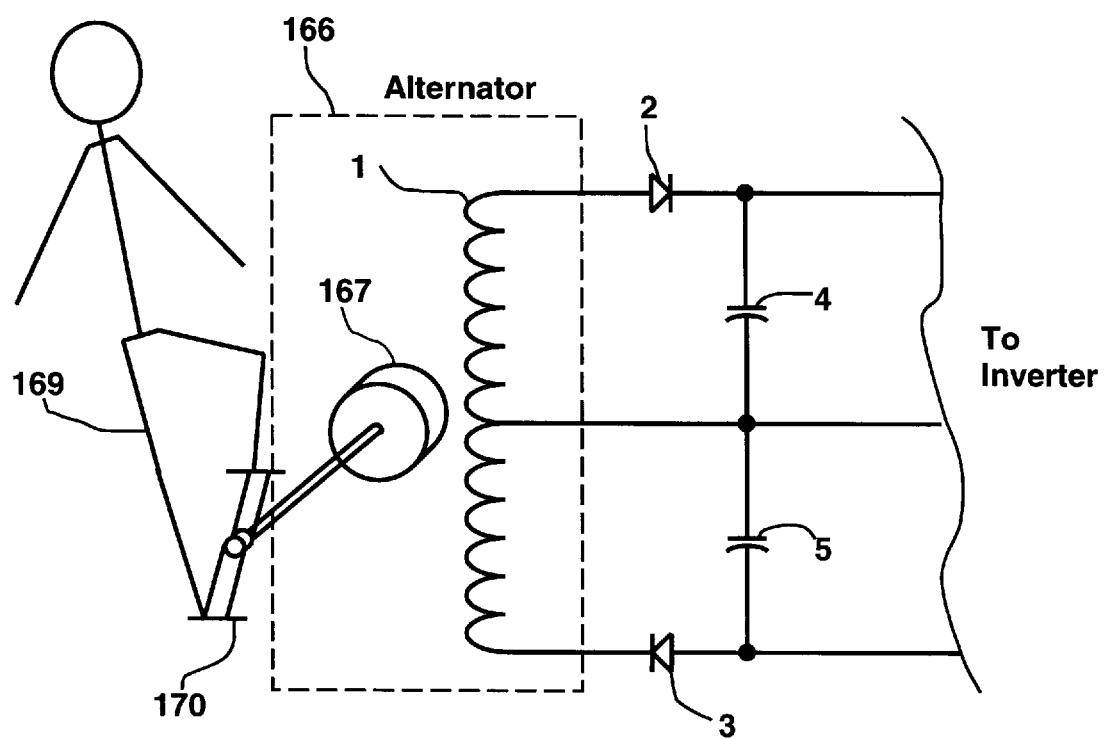
FIG. 10 is part block diagram part circuit schematic that shows exercise equipment providing mechanical power to an alternating current center tapped power source 1.

FIG. 10 shows the variable voltage alternating power source 1 to be the output winding of alternator 166, which has a rotor 167 driven by a treadmill 170 as a form of exercise equipment, which in turn is driven by a human being 169.

Operation of the Invention

Figure 4:
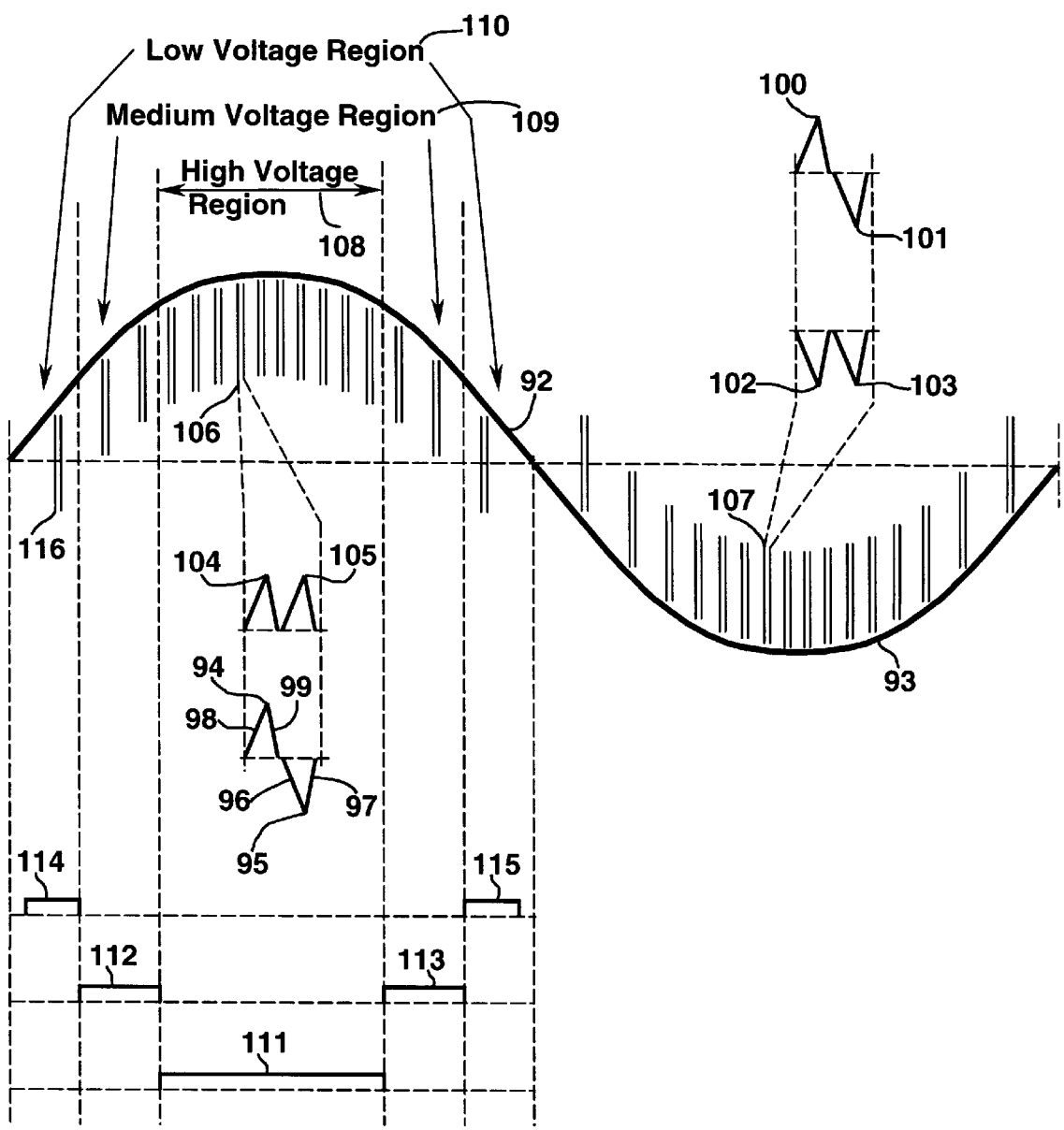
FIG. 4 gives a timing diagram of the operation of the invention illustrating the injection of alternating current pulses into the utility power grid during one cycle of the utility power given average input voltages.

The operation of the circuit in FIG. 1 will now be described. FIG. 4 will be used to help to understand the timing of the events as they are synchronized to the utility power frequency. The utility power cycle is represented by the positive sinusoidal voltage waveform 92 and the negative sinusoidal voltage waveform 93. Note that the inverter injects multiple similarly shaped current pulses 106 into the utility termination 22. The shape of the current pulses that are injected into the positive half-cycle of the utility power termination is represented by pulses 104 and 105. Note that both of these pulses have a positive direction. Pulses 104 and 105 are generated by alternating current pulses 94 and 95 in the primary winding 6. Similarly for the negative half cycle 93, multiple similarly shaped current pulses 107 flow from utility termination 22. The shape of the current pulses that flow from the utility termination during the negative half cycle are represented by pulses 102 and 103. Pulses 102 and 103 are generated by alternating current pulses 100 and 101 in the primary winding 6.

The microprocessor 55 in the inverter control circuit distributes the multiplicity of current pulses 106 in a sinusoidal manner throughout the positive half cycle 92, such that the current pulses at the top of the waveform 92 are more densely packed than near the zero crossings of the waveform. Similarly, the multiplicity of current pulses 107 are sinusoidally distributed throughout the negative half-cycle 93.

Assume for the purpose of this explanation that the positive half cycle of the utility power has just started. Pulse 114 in FIG. 4 illustrates that moment in time as the positive voltage sinewave 92 is just starting to increase. A current pulse is to be injected at the moment in time characterized by the pulse position 116 in FIG. 4. Assume also that the microprocessor has determined that the input voltage is of a magnitude that is a small amount greater than the output voltage if transformed and connected through the low voltage terminals 18 and 19. The microprocessor, therefore, turns IGBT switch 35 on for the duration shown by pulse 114 in FIG. 5. When the time for current pulse 116 has arrived the microprocessor turns on IGBT switch 9 for a short duration, of the order of 50 microseconds, this is illustrated by the leading edge 98 of current pulse 94. Then the microprocessor turns switch 9 off and the positive current subsides to zero as the trailing edge 99 shows. During the leading edge of the current pulse, the primary current flows from the positive end of capacitor 4 through switch 9, inductor 8, and primary winding 6 back to the other end of capacitor 4. During the trailing edge 99 of the current pulse, the primary current flows from inductor 8, where it is generated, through primary winding 6, to the center-tap end of capacitor 5, and then from the negative end of capacitor 5 through bypass diode 12 back to the inductor. The secondary current pulse, which looks like pulse 104 in FIG. 4, flows from terminal 18 of the secondary winding 13 through diode 40 and switch 35 to the utility termination 22; the current returns from utility termination 21 to the center tap of the secondary winding.

A very short time after the positive current pulse goes to zero, the microprocessor turns on switch 10. The leading edge of that current pulse looks like leading edge 96 of current pulse 95. A time of the order of 50 microseconds after the current pulse starts, switch 10 is turned off and the current decays to zero as illustrated by trailing edge 97 of current pulse 95. During the leading edge 96 of current pulse 95, the primary current flows from the center-tap end of capacitor 5 through primary winding 6, inductor 8, and switch 10 back to the negative end of capacitor 5. During the trailing edge 97 of the current pulse, the primary current flows from inductor 8, where it is generated, through bypass diode 11 into the positive end of capacitor 4 and then returns from the center-tap end of capacitor 4 through primary winding 6 back to the inductor. The secondary current pulse flows from terminal 19 through diode 39 and switch 35 to termination 22 of the utility power. The current returns from termination 21 back to the center tap 20 of the secondary winding 13.

Assume now that time advances to the region represented by pulse 112 in FIG. 4. Two pulses are generated in the primary winding 6 in a manner as previously described. But since the output voltage is now in the medium region 109, which is larger than in the low region 110, the microprocessor selects a medium turns ratio for the transformer by turning on switch 29 for the duration of pulse 112. During the positive part 94 of the ac current pulse, the secondary current now flows from termination 16 through diode 34 and switch 29 to the utility termination 22 and returns to the center-tap 20. During the negative part 95 of the ac current pulse, the secondary current flows from termination 17 through diode 33 and switch 29 to the utility termination 22 and returns to the center tap 20.

Assume next that time advances to the region represented by pulse 111 in FIG. 4. Multiple pulses are generated in the primary winding 6 in a manner as previously described. But since the output voltage is now in the high region 110, which is larger than in the medium region 109, the microprocessor selects a high turns ratio for the transformer by turning on switch 23 for the duration of pulse 111. During the positive part 94 of the ac current pulse, the secondary current now flows from termination 14 through diode 28 and switch 23 to the utility termination 22 and returns to the center-tap 20. During the negative part 95 of the ac current pulse, the secondary current flows from termination 15 through diode 27 and switch 23 to the utility termination 22 and returns to the center tap 20.

As time advances to the region represented by pulse 113 the microprocessor operates the circuit as it did for the time region 112. Similarly, the region 115 is handled identically to the way region 114 was handled.

Figure 5:
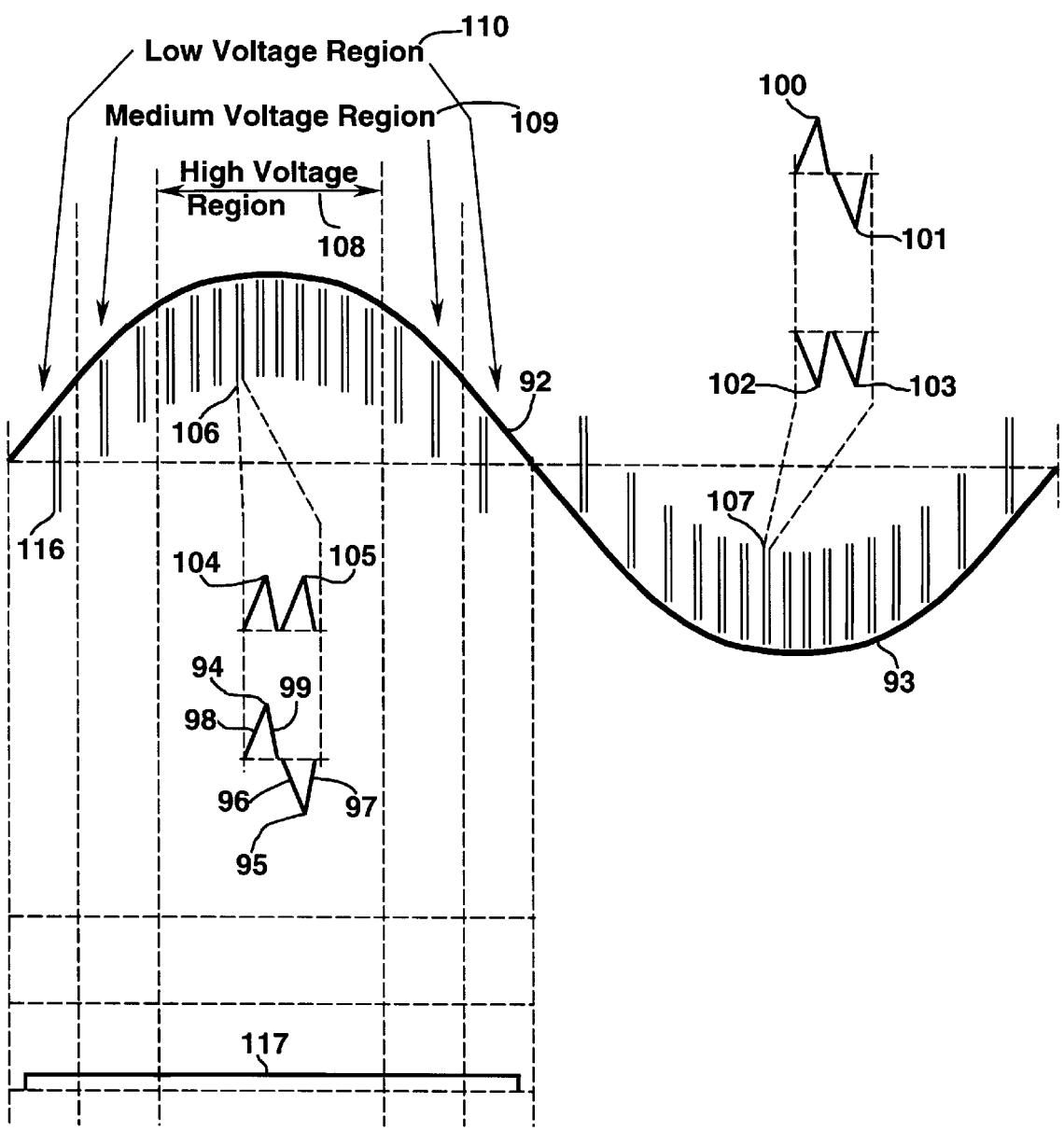
FIG. 5 gives a timing diagram of the operation of the invention illustrating the injection of alternating current pulses into the utility power grid during one cycle of the utility power given high input voltages.

The negative cycle region 93 is handled in the primary circuit identically to the way it was handled in the positive region 92, except that in the secondary circuit the complimentary set of switches and associated diodes is used as follows: For the low turns-ratio region, switch 36 and diodes 37 and 38 are used. For the medium turns-ratio region, switch 30 and diodes 31 and 32 are used. For the low turns-ratio region, switch 24 and diodes 25 and 26 are used. FIG. 5 illustrates the case when the dc input voltage is high enough such that when using the lowest turns-ratio (secondary winding terminations 18 and 19) the voltage produced by the secondary winding 13 of transformer 7 is higher than the highest value of the utility voltage. In this case IGBT switch 23 is turned on during almost the entire positive half cycle as shown by pulse 117 in FIG. 5. Similarly, the IGBT switch 24 is turned on during almost the entire negative cycle of the utility voltage.

Figure 6:
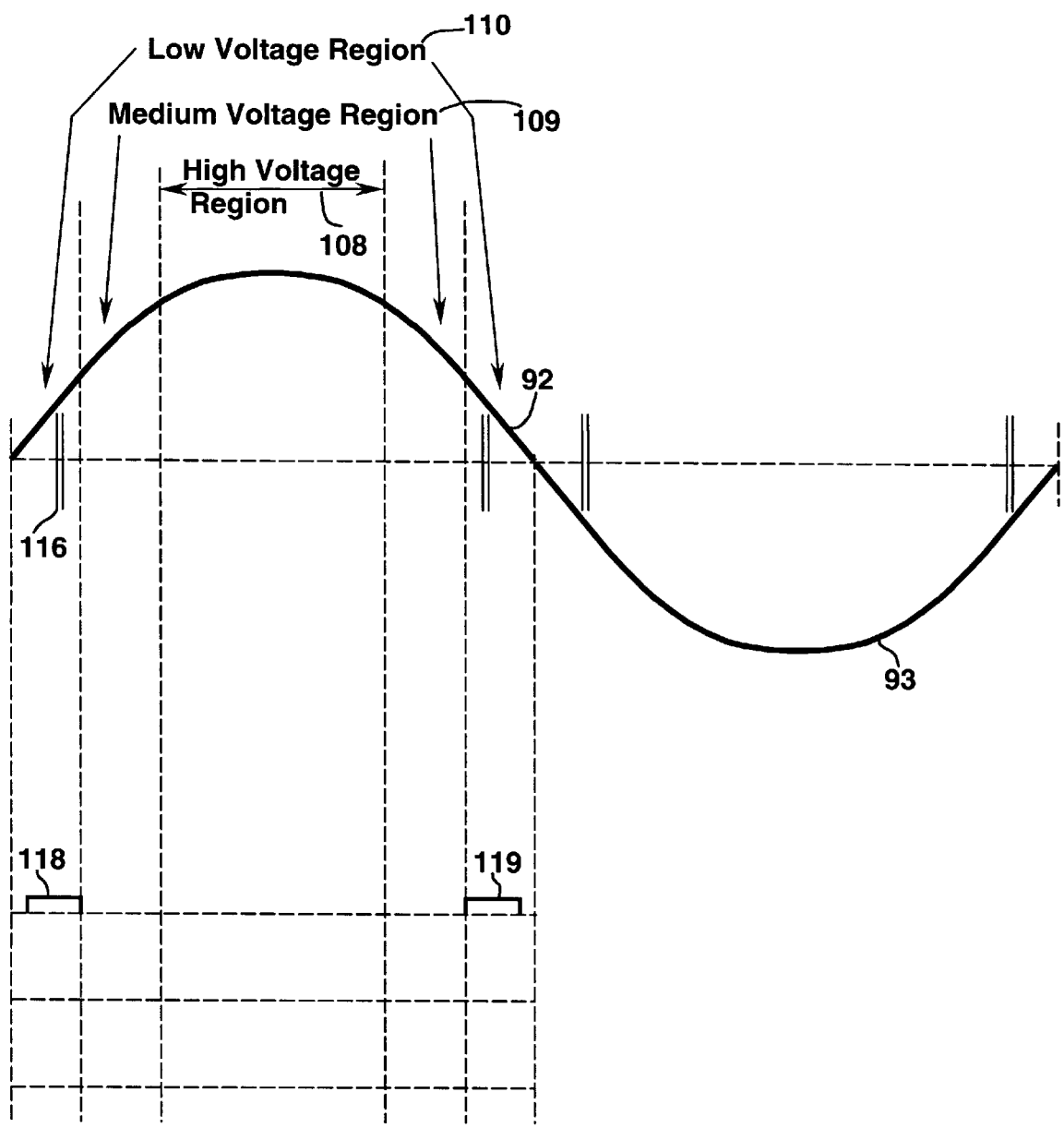
FIG. 6 gives a timing diagram of the operation of the invention illustrating the injection of alternating current pulses into the utility power grid during one cycle of the utility power given very low input voltages.

FIG. 6 illustrates the behavior of the circuit when the dc input voltage is quite small. By using the highest turns-ratio of transformer 7 (secondary winding terminations 14 and 15) a small amount of energy can still be transferred in one half cycle. IGBT switch 35 is turned on during pulse 118 and 119 of the positive half cycle 92. Similarly, IGBT switch 36 is turned on during the identical positions within the negative half cycle 93. Note that for this case, the goal of producing an approximately sinusoidal current flow into and out of the utility power connection has been abandoned; this is a disadvantage of this invention. However, the current flow is still balanced within each half cycle in that a current pulse flows at the leading edge as well as the trailing edge of each half cycle.

FIG. 5 shows the normal operating region of the circuit. FIG. 6 shows operation with very high input voltages and FIG. 7 shows operation with very low input voltages. Intermediate cases between those three cases are, of course, possible. At the low end of the input voltage range, it is possible to operate in the medium as well high turns-ratio regions within each half cycle. At the high end of the input voltage, it is possible to operate in the low as well as medium turns-ratio regions within each half cycle.

It is useful to describe the function of inductor 8 within this circuit. It should be understood that inductor 8 represents both the external inductor shown as well as the internal inductance that is part of the equivalent circuit for each transformer. As in the invention by Wilkerson and the invention by Steigerwald cited above, an inductor is needed to keep control over the rise time of the current pulse that is injected into the utility power termination. The voltage across inductor 8 is the difference between the dc input voltage and the output voltage supplied by the utility power subject to the turns-ratio of the transformer from secondary to primary, if one ignores small voltage drops across the diodes and the IGBT switch. In this invention, see FIG. 1, a small amount of energy is sent back to capacitor 5 during the decay of the positive current pulse and to capacitor 4 during the decay of the negative current pulse. This may seem like a disadvantage, but really is not, because that energy is used again as subsequent pulses transfer energy to the utility power termination. A similar mechanism occurs for the circuit shown in FIG. 7, except that the energy is returned to capacitor 77 during both half cycles.

Capacitors 4 and 5 in FIG. 1 as well as capacitor 77 in FIG. 7 should be dimensioned sufficiently large to cause only a small voltage dip during each half cycle of the utility power, in order to insure substantially the same size current pulses throughout a half cycle of the utility power.

Algorithm for Microprocessor

As shown in FIG. 2 the microprocessor 55 must process the input data and generate appropriate output pulses for each of the eight IGBT switches 57 through 64. What follows is an algorithm for the microprocessor to operate through a full cycle of the utility power voltage.

1. The microprocessor looks at AD converter 50 to determine the beginning of the positive half cycle, which starts at the time the AD converter registers a positive voltage. At the time the microprocessor begins operating it determines from a few cycles of the utility power, whether the circuit is connected to a 60 cycle, 50 cycle, or some other power frequency. It also determines the maximum voltage of the utility power, which may be something other than 155 volts for a nominal ac voltage of 110 volts.

2. The microprocessor determines from AD converter 51 the value of the input voltage in capacitor 4 (or 77 for the circuit in FIG. 7). Given the input voltage and the voltage of the utility power that it now has, the microprocessor can determine what turns-ratios it needs to operate during both the positive and negative half cycles of the utility power. For example, if the input voltage is 60 volts and the maximum utility voltage is 155 volts (for a nominal 110 volt ac circuit), then it would be prudent to use a low 1:1 turns-ratio, a medium 1:2 turns-ratio, and a high 1:3 turns-ratio as illustrated in FIG. 4. If the input voltage was only 15 volts, then it would make sense to use only a high 1:3 turns-ratio and operate only at the beginning and the end of each half cycle as illustrated in FIG. 6. Even though the turns-ratios 1:1, 1:2, and 1:3 were given as an example, other turns-ratios may be used to match a range of input voltages to a utility power voltage.

3. In addition, the microprocessor preplans, as detailed further in steps 14 and 15, the set of ac current pulses with respect to duration as well as placement in time during the positive and the negative utility power half cycle, such that the result will be an approximate sinusoidal current flow into and out of the utility power connection as illustrated in FIG. 4 and FIG. 5. The microprocessor does the sinusoidal approximation by keeping the current pulses at the beginning and end of each half cycle shorter and fewer in number per unit time in comparison to the middle of each half cycle, such that the average current at different sections within the half cycle approximates a sinusoid. The number and placement of ac current pulses during the negative half cycle will always be identical to the number and placement of ac current pulses during the positive half cycle. This is done for the purpose of maintaining a true ac power flow into the utility power connection synchronized to the utility power frequency. Only if the input voltage is too low, will the goal of sinusoidal current flow be abandoned as previously stated. Nevertheless, the power flow will always be maintained as an ac power flow and the current pulses will always be balanced with respect to the center of each half cycle.

4. Using its own internal clock and its preplanned ac current pulse pattern, the microprocessor now waits until it is time to turn on the first current pulse. Assuming that the plan matches the sequence as illustrated in FIG. 4, the microprocessor now directs the turn on of IGBT switch 35 through activation circuit 63, which selects a low turns-ratio.

5. Next the microprocessor turns on switch 9 through activation circuit 57. As a positive current rises, the microprocessor monitors that current through AD converter 52.

6. After the pre-planned duration of this current pulse, say 45 microseconds, the microprocessor turns switch 9 off through activation circuit 57.

7. The microprocessor monitors the trailing current as the current decays. Shortly after the current goes to zero, the microprocessor turns on switch 10 through activation circuit 58 and monitors that current through AD converter 53.

8. After the pre-planned duration of this current pulse, its duration needs to be the same as the previous positive current pulse to maintain ac balance, the microprocessor turns off switch 10.

9. The microprocessor now monitors the decay of the negative current pulse.

10. Next the microprocessor computes the energy transferred during both the negative and positive current pulse by multiplying average charge with the average utility voltage during each current pulse, taking the appropriate secondary to primary turns-ratio into account. It computes the average charge from the average current by dividing it by the pulse width. The microprocessor accumulates the energy for each half cycle and saves it for subsequent processing.

11. The microprocessor now gets ready to start the next pair of ac current pulses by deciding whether the turns-ratio needs to be changed or not. If it needs to be changed, then it will turn off the switch in the secondary circuit that is currently on, switch 35 in our example, and turns on a different turns-ratio switch, assume switch 29 for a medium turns-ratio as an example.

12. The microprocessor now repeats steps 5 through 10 for each pair of ac current pulses in its plan. In between each pair of ac current pulses, the microprocessor determines whether the turns-ratio needs to be changed. If it does, then it turns the current switch off and turns another switch on.

13. Once the preplanned pairs of ac current pulses have been handled for the positive half cycle, the negative half cycle is handled identically except that the complimentary set of turns-ratio switches is used instead, as previously explained. This is switch 36 for a low turns-ratio, switch 30 for a medium turns-ratio, and switch 24 for a high turns-ratio.

14. At the end of a full cycle, consisting of a positive and negative half cycle, the microprocessor measures the input voltage again through AD converter 51. If the input voltage has increased, then the microprocessor will plan a slight increase in current flow for the next full cycle. If the input voltage has decreased, then the microprocessor will plan a slight decrease in currant flow for the next full cycle.

15. If at the end of several full cycles, the input voltage does not change, then the microprocessor will test whether it is maximizing energy production by the input energy source. It will first slightly decrease the current flow by reducing pulse width slightly or removing one ac current pulse per half cycle. If after several cycles, the input voltage increases such that the energy flow per full cycle is actually increased, then it will keep on decreasing the current until it has found the energy transfer maximum. The next time the microprocessor finds a period of no input voltage change, it will change algorithm and will increase the current and will determine, whether an actual increase in energy transfer per full cycle takes place. If the answer is yes, it will keep on increasing the current until a maximum energy transfer per full cycle has been found. In this manner the microprocessor will hunt to either side of the current operating point in order to find an operating point that truly maximizes power production. If while in this second hunting algorithm the microprocessor finds that the input voltage changes more than should be expected by the exercise of the hunting algorithm, then it will revert back to the algorithm in step 14.

The microprocessor is also able to monitor the proper working of the various components of the inverter circuit by monitoring the current pulses and comparing the size of the current pulse to what it expects the size to be. If a current pulse deviates from normal in a significant way for several full cycles, then the microprocesser will shut down the circuit by simply keeping all IGBT switches turned off.

Microprocessor Peripherals

Additional peripheral devices may be attached to the microprocessor such as digital display devices to show the amount of power being transferred, or the average amount of current flowing to the utility power termination. Also, communications devices may be attached to the microprocessor for the purpose of monitoring and operating the current invention remotely.

It is understood that the foregoing detailed description is given merely by way of illustration and many modifications can be made therein without departing from the spirit or scope of the present invention.

What is claimed is:

1. An apparatus for transferring electric power from a variable voltage direct current source to a provider of alternating electric power with constant voltage and frequency characteristics comprising:

a. switching means for the purpose of converting said variable voltage dc power to alternating current power of substantially higher frequency than frequency of said provider of electric power;

b. alternating current transforming means with multiple secondary windings to convert said higher frequency ac power to multiple instances of ac power with different output voltage characteristics;

c. multiple separate ac to dc conversion means to convert said instances of ac power with different output voltage characteristics to an identical number of instances of dc power with different voltage characteristics;

d. switching means synchronized to frequency of said provider of electric power to connect any one of said multiple instances of dc power with different voltage characteristics to said provider of electric power, such that at most one of said instances of dc power is connected to said provider of electric power at any moment in time; the voltage of said connected instance of dc power is additionally characterized by being the instance in closest proximity above the voltage of said provider of electric power during its positive half cycle, and by being the instance in closest proximity below the voltage of said provider of electric power during its negative half cycle;

e. controlling means to monitor a number of parameters including the voltage of said provider of electric power of constant frequency and voltage, the timing of said provider of electric power, the voltage of said variable voltage dc input power, the values of the positive and negative currents of said ac power of higher frequency;

f. said controlling means derives from said parameters timed switching signals controlling said switching means for the purpose of connecting said variable voltage dc input power to said transforming means at a substantially higher frequency than the frequency of said provider of electric power of constant frequency and voltage;

g. additionally, said controlling means derives from said parameters timed switching signals for said switching means connecting at most one of said instances of dc power with different output voltage characteristics to said provider of electric power with constant frequency and voltage in synchronism with said constant frequency;

h. additionally, said alternating current transforming means has coaxial windings characterized by the secondary windings being located within a tubular primary winding;

whereby electric power is transferred efficiently from a variable voltage dc power source to said provider of alternating electric power of constant frequency and voltage.

2. The circuit according to claim 1 wherein said variable dc input power is comprised of a variable voltage ac generator, whose output is converted to dc power.

3. The circuit according to claim 2 wherein said variable voltage ac generator is powered by a windmill.

4. The circuit according to claim 2 wherein said variable voltage ac generator is powered by a generator powered by exercise equipment.

5. The circuit according to claim 1 wherein said switches are comprised of Insulated Gate Bipolar Transistors (IGBTs).

6. The circuit according to claim 1 wherein said multiple separate ac to dc conversion means use center-tapped secondary windings of said coaxial winding transformer.

7. The circuit according to claim 1 wherein said multiple separate ac to dc conversion means use full-wave rectification techniques.

8. The circuit according to claim 1 wherein said means of controlling said means of switching consist of analog to digital converters delivering said parameters in digital form to a microprocessor that controls said switches individually.

9. The circuit according to claim 8 wherein said means of controlling said means of switching control the energy flow from said dc input source to said provider of alternating electric power by increasing current flow if voltage of said dc input source is increasing, and decreasing current flow if voltage of said dc input source is decreasing.

10. The circuit according to claim 8 wherein said means of controlling said means of switching maximizes the energy flow from said dc input source to said provider of alternating electric power by alternately decreasing and increasing current flow to hunt for a maximum energy transfer point.

11. An apparatus for transferring electric power from a variable voltage alternating current source with center tapped construction to a provider of alternating electric power with constant voltage and frequency characteristics comprising:

a. conversion means for the purpose of converting power from said variable voltage alternating current source with center tapped construction to direct current power of variable voltage with center tapped construction;

b. switching means for the purpose of converting said variable voltage dc power with center tapped construction to alternating current power of substantially higher frequency than frequency of said provider of electric power;

c. alternating current transforming means with multiple secondary windings to convert said higher frequency ac power to multiple instances of ac power with different output voltage characteristics;

d. multiple separate ac to dc conversion means to convert said instances of ac power with different output voltage characteristics to an identical number of instances of dc power with different voltage characteristics;

e. switching means synchronized to frequency of said provider of electric power to connect any one of said multiple instances of dc power with different voltage characteristics to said provider of electric power, such that at most one of said instances of dc power is connected to said provider of electric power at any moment in time; the voltage of said connected instance of dc power is additionally characterized by being the instance in closest proximity above the voltage of said provider of electric power during its positive half cycle, and by being the instance in closest proximity below the voltage of said provider of electric power during its negative half cycle;

f. controlling means to monitor a number of parameters including the voltage of said provider of electric power of constant frequency and voltage, the timing of said provider of electric power, the voltage of said variable voltage dc input power, the values of the positive and negative currents of said ac power of higher frequency;

g. said controlling means derives from said parameters timed switching signals controlling said switching means for the purpose of connecting said variable voltage dc input power to said transforming means at a substantially higher frequency than the frequency of said provider of electric power of constant frequency and voltage;

h. additionally, said controlling means derives from said parameters timed switching signals for said switching means connecting at most one of said instances of dc power with different output voltage characteristics to said provider of electric power with constant frequency and voltage in synchronism with said constant frequency;

whereby electric power is transferred efficiently from a variable voltage ac power source with center tapped construction to said provider of alternating electric power of constant frequency and voltage.

12. The circuit according to claim 11 wherein said variable voltage ac generator with center tapped construction is powered by a windmill.

13. The circuit according to claim 11 wherein said variable voltage ac generator with center tapped construction is powered by a generator powered by exercise equipment.

14. The circuit according to claim 11 wherein said transformer is characterized by having coaxial windings, characterized by the secondary windings being located within a tubular primary winding.

15. An apparatus for injecting electric power from a variable voltage direct current source to a provider of alternating electric power with constant voltage and frequency characteristics, such that the current injected into the provider of alternating electric power has a substantially sinusoidal waveform; said apparatus comprises:

a. switching means for the purposes of converting said variable voltage dc power to alternating current power of substantially higher frequency than frequency of said provider of electric power;

b. alternating current transforming means with multiple secondary windings to convert said higher frequency ac power to multiple instances of ac power with different output voltage characteristics;

c. multiple separate ac to dc conversion means to convert said instances of ac power with different output voltage characteristics to an identical number of instances of dc power with different voltage characteristics;

d. switching means synchronized to frequency of said provider of electric power to connect any one of said multiple instances of dc power with different voltage characteristics to said provider of electric power, such that at most one of said instances of dc power is connected to said provider of electric power at any moment in time; the voltage of said connected instance of dc power is additionally characterized by being the instance in closest proximity above the voltage of said provider of electric power during its positive half cycle, and by being the instance in closest proximity below the voltage of said provider of electric power during its negative half cycle;

e. controlling means to monitor a number of parameters including the voltage of said provider of electric power of constant frequency and voltage, the timing of said provider of electric power, the voltage of said variable voltage dc input power, the values of the positive and negative currents of said ac power of higher frequency;

f. said controlling means derives from said parameters timed switching signals controlling said switching means for connecting purposes of said variable voltage dc input power to said transformer at a substantially higher frequency than the frequency of said provider of electric power of constant frequency and voltage; more particularly, said controlling means controls the duration, number and timing of individual ac current pulses produced by said switching means for connecting purposes, such that the average current injected into said provider of electric power is approximately sinusoidal after subjected to filtering means;

g. additionally, said controlling means derives from said parameters timed switching signals for said switching means connecting at most one of said instances of dc power with different output voltage characteristics to said provider of electric power with constant frequency and voltage in synchronism with said constant frequency;

h. additionally, said alternating current transforming means has coaxial windings characterized by the secondary windings being located within a tubular primary winding;

whereby electric power is transferred efficiently from a variable voltage dc power source to said provider of alternating electric power of constant frequency and voltage, such that the current injected into said provider of power is substantially sinusoidal.

16. The circuit according to claim 15 wherein said switches are comprised of Insulated Gate Bipolar Transistors (IGBTs).

* * * * *